(12) United States Patent  (10) Patent No.: US 9,167,096 B2
Shaw et al.  (45) Date of Patent: Oct. 20, 2015

(54) AUTOMATIC DELIVERY OF VISUAL VOICEMAIL

(75) Inventors: Venson Shaw, Kirkland, WA (US); Gholam-Reza Rahsaz, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 421 days.

(21) Appl. No.: 12/636,353

(22) Filed: Dec. 11, 2009

(65) Prior Publication Data

US 2011/0143723 A1  Jun. 16, 2011

(51) Int. Cl.
*H04M 11/10* (2006.01)
*H04M 3/533* (2006.01)
*H04L 12/58* (2006.01)

(52) U.S. Cl.
CPC ....... *H04M 3/53333* (2013.01); *H04L 12/5855* (2013.01); *H04L 12/5895* (2013.01); *H04L 51/14* (2013.01); *H04L 51/38* (2013.01)

(58) Field of Classification Search
CPC .... H04L 12/5895; H04L 51/38; H04L 12/587
USPC ........... 455/413, 414.1, 67.7, 66.1, 412.2, 455/422.1, 566; 379/67.1, 88.18
See application file for complete search history.

(56) References Cited

U.S. PATENT DOCUMENTS

| | | | |
|---|---|---|---|
| 6,201,857 B1 * | 3/2001 | Hamley | 379/88.1 |
| 8,103,253 B2 * | 1/2012 | Gatzke et al. | 455/413 |
| 8,260,260 B1 * | 9/2012 | Brown et al. | 455/411 |
| 2005/0100143 A1 * | 5/2005 | Bedingfield, Sr. | 379/88.12 |
| 2006/0120358 A1 * | 6/2006 | Narasimhan et al. | 370/355 |
| 2007/0207785 A1 * | 9/2007 | Chatterjee et al. | 455/414.1 |
| 2009/0077191 A1 * | 3/2009 | Bristow et al. | 709/207 |
| 2009/0154667 A1 * | 6/2009 | Hao et al. | 379/88.18 |
| 2010/0150322 A1 * | 6/2010 | Yin et al. | 379/88.14 |
| 2010/0151834 A1 * | 6/2010 | Kalbag | 455/413 |
| 2010/0279663 A1 * | 11/2010 | Wang et al. | 455/413 |
| 2011/0053618 A1 * | 3/2011 | Lin et al. | 455/466 |
| 2011/0081006 A1 * | 4/2011 | Hao et al. | 379/88.13 |
| 2011/0143721 A1 * | 6/2011 | Raphael et al. | 455/413 |

* cited by examiner

*Primary Examiner* — Michael Faragalla
*Assistant Examiner* — Gerald Oliver
(74) *Attorney, Agent, or Firm* — Baker & Hostetler LLP

(57) ABSTRACT

A visual voicemail may be automatically transmitted to a receiving mobile device after the visual voicemail fails to reach the receiving mobile device during an initial delivery attempt. For example, a visual voicemail delivery system may receive an indication of an incoming voicemail, and a visual voicemail associated with the incoming voicemail may be generated. The system may maintain the delivery status of the visual voicemail. For example, if the receiving mobile device retrieves the visual voicemail from the system via a communication session, the system may mark the visual voicemail as delivered. After a predetermined period of time has elapsed, the system may determine whether the visual voicemail has been delivered to the mobile device. If the system determines that the visual voicemail has not been delivered to the mobile device, the system may automatically transmit visual voicemail to the mobile device.

18 Claims, 5 Drawing Sheets

AUTOMATIC DELIVERY OF VISUAL VOICEMAIL

BACKGROUND

Communications devices such as cellular telephones, mobile communication devices, personal digital assistants (PDAs), laptops, and the like are becoming more prevalent as technology advances and makes these devices more powerful and more affordable. Additionally, the expanding capabilities of such communications devices have contributed to the improvement and enhancement of traditional technologies such as voicemail. For example, a traditional voicemail included an audio message playable when a user established a telephone connection to a voicemail server by, for example, dialing a telephone number associated with the voicemail server. Currently, a voicemail may include a visual aspect or interface associated therewith ("a visual voicemail"). For example, an visual interface may be displayed to a user such that the user may interact with the interface to listen to a voicemail, delete a voicemail, read a textual transcription of a voicemail, view characteristics such as receipt date and/or time, a name of a calling party leaving a voicemail, or the like. Unfortunately, if such a visual voicemail fails to reach the receiving mobile communication device during an initial delivery attempt, the visual voicemail may be not be delivered to a user or recipient until another voicemail arrives causing a delay in the recipient receiving the visual voicemail.

SUMMARY

According to an example embodiment, visual voicemail associated with an incoming voicemail may be automatically delivered to a mobile device. For example, an indication of an incoming voicemail for a mobile device may be received by a system for visual voicemail delivery. After a predetermined period of time may have elapsed, the system may determine whether a visual voicemail associated with the incoming voicemail may have been delivered to the receiving mobile device. According to an example embodiment, the system may include a visual voicemail register that may track delivery status of a visual voicemail. In one embodiment, the system may determine whether the visual voicemail may have been delivered based on the delivery status of the visual voicemail that may be included in the visual voicemail register. If, based on the determination, the visual voicemail may not have been transmitted to the mobile device, the system may transmit the visual voicemail to the mobile device.

DETAILED DESCRIPTION OF ILLUSTRATIVE EMBODIMENTS

Figure 1:
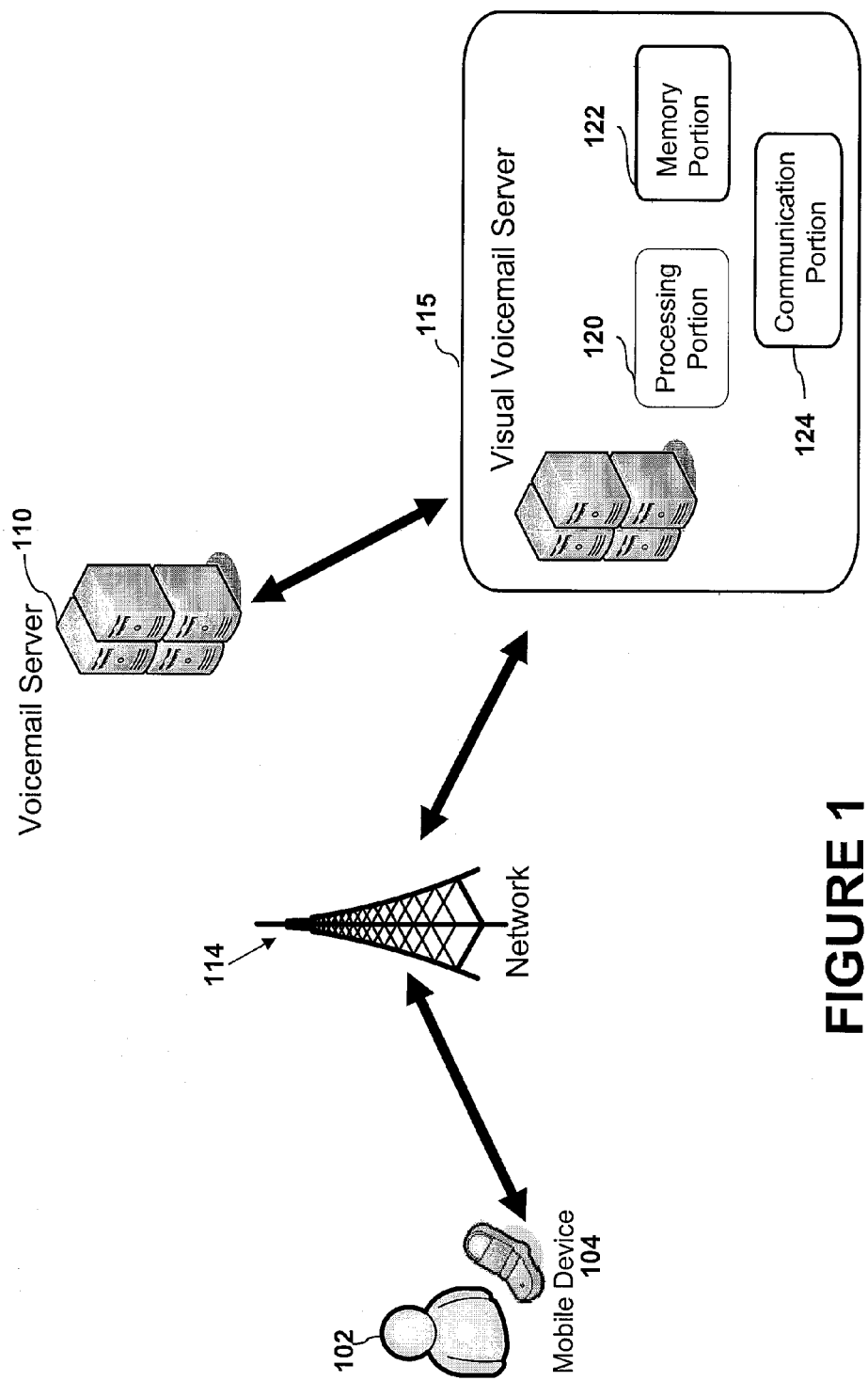
FIG. 1 depicts example systems for delivering a visual voicemail to a mobile communication device.

FIG. 1 illustrates a network environment in which one or more embodiments of delivering a visual voicemail may be implemented. A user 102 may operate a mobile device 104. Mobile device 104 may be representative of any appropriate type of device that may be utilized, for example, to receive a visual voicemail. According to example embodiments, mobile device 104 may be any appropriate mobile device, such as, for example, a portable device, a variety of computing devices including (a) a portable media player, e.g., a portable music player, such as an MP3 player, a walkmans, etc., (b) a portable computing device, such as a desktop, a laptop, a personal digital assistant ("PDA"), a portable phone, such as a cell phone of the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

Mobile device 104 may include hardware components such as a processor, a graphics card, a storage component, a memory component, an antenna, a communication component, an interface component such as a speaker, a display, a keypad, a microphone, or the like. Mobile device 104 may also include software components such as an operating system that may control the hardware components.

As shown in FIG. 1, mobile device 104 may also be in communication with a network 114. Network 114 may be any type of communication network such as the internet, a Local Area Network (LAN), a Wide Area Network (WAN), a cellular telephone network, or the like. For example, network 114 may include the example networks described below in FIGS. 3-5 such as Global System for Mobile communication ("GSM"), General Packet Radio Service ("GPRS"), Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), WiFi, WiMAX, or the like.

Network 114 may be operated by a network provider such as an internet service provider, a cellular telephone provider, or the like. According to an example embodiment, the network provider may offer bandwidth and/or network access to subscribers thereof to enable communication between the subscribers and other devices such as cellular phones, PDAs, PCs, Voice over Internet Protocol devices, analog telephone devices, or the like. In one embodiment, the bandwidth and/or network access provided by the network provider may be limited to a location such as, for example, a country, a state, a city, a town, a county, or any other region defined by the network provider in which network 114 may operate.

Additionally, network 114 may enable mobile device 104 to communicate with other communication devices such as other mobile devices, telephones, or the like that may be operated by other subscribers and/or individuals and various computing devices such as visual voicemail server 115 and other servers that may be accessible via network 114. Visual voicemail server 115 may be any one or more computing devices and/or software capable of performing visual voicemail functionality such as receiving an indication of an incoming voicemail, determining whether a visual voicemail has been delivered to a mobile device after a predetermined period of time has elapsed, and transmitting the visual voicemail to the mobile device when the visual voicemail has not been delivered, which will be described in more detail below.

Visual voicemail server 115 may include any combination of hardware components such as processors, databases, storage drives, registers, cache, RAM memory chips, data buses, or the like and/or software components such as operating systems, database management applications, or the like. In one embodiment, visual voicemail server 115 may be dedicated to performing visual voicemail functions. Alternatively, visual voicemail server 115 may be a component of a device or system that performs other functions in addition to visual voicemail functions.

As shown in FIG. 1, in one embodiment, visual voicemail server 115 may include a processing portion 120, a memory portion 122, and a communication portion 124. Processing portion 120, memory portion 122, and communication portion 124 are in operative communication with each other.

According to an example embodiment, processing portion 120 may execute instructions in the form of, for example, software or program code that may be executed by processing portion 120 to cause visual voicemail server 115 to deliver visual voicemails. For example, the execution of the instructions may direct visual voicemail server 115 to determine whether a visual voicemail has been delivered to a mobile device after a predetermined period of time has elapsed, transmit a visual voicemail to a mobile device when, based on the determination, the visual voicemail has not been delivered, or perform any other suitable functions, which will be described in more detail below. According to one embodiment, the processing portion 120 may include one or more standardized processors, specialized processors, microprocessors, or the like distributed or centrally located that may execute the instructions.

As described above, visual voicemail server 115 may further include memory portion 122. In one embodiment, memory portion 122 may store the instructions that may be executed by processing portion 120, visual voicemails, and the delivery status of visual voicemails, or the like. For example, memory portion 122 may include random access memory (RAM), read only memory (ROM), cache, Flash memory, a hard disk, or any other suitable storage component that may store instructions, visual voicemails, the delivery status of the voicemails, or the like. As shown in FIG. 1, in one embodiment, memory portion 122 may be a separate component in communication with communication portion 124 and processing portion 120. According to another embodiment, the memory portion 122 may be integrated into processing portion 120 and/or communication portion 124.

Visual voicemail server 115 may further also include communication portion 124. According to one embodiment, communication portion 124 may be capable of connecting visual voicemail server 115 to a network such as network 114, and/or communicating with internal or external devices. For example, communication portion 124 may enable visual voicemail server 115 to communicate with a voicemail server, such as voicemail server 110, to receive an indication of an incoming voicemail. Communication portion 124 may enable visual voicemail server 115 to communicate with a mobile device, such as mobile device 104, such that visual voicemail server 115 may transmit a notification that a visual voicemail is available. Communication portion 124 may also establish a communication session with a mobile device, such as mobile device 104, such that a visual voicemail may be transmitted to mobile device 104. In another example, communication portion 124 may receive an indication confirming arrival of a visual voicemail at mobile device 104, and provide the indication to processing portion 120 such that processing portion 120 may determine whether the visual voicemail may have been delivered.

In one embodiment, visual voicemail server 115 may be associated with a network such as network 114 that may provide wireless communications to user 102. Alternatively, visual voicemail server 115 may be owned, operated, or maintained by a third party, and may be a component of a third party system that may provide voicemail services to the operator of network 114.

Figure 2:
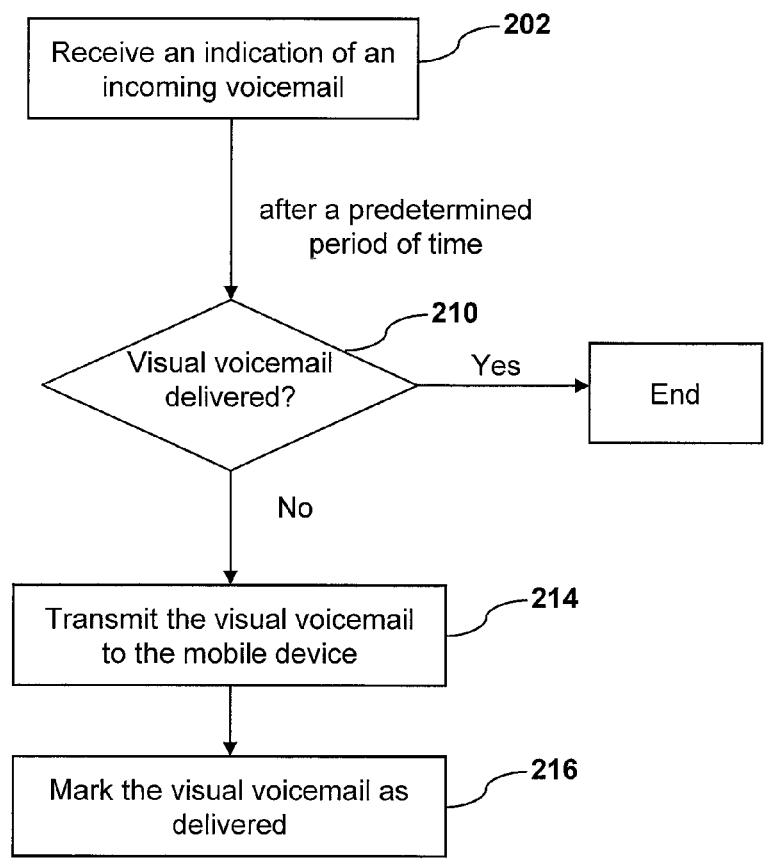
FIG. 2 depicts an example process for delivering a visual voicemail to a mobile communication device.

FIG. 2 depicts an example method 200 for providing a visual voicemail to a mobile device such as mobile device 104. As shown in FIG. 2, at 202, visual voicemail server 115 may receive an indication of an incoming voicemail message from a voicemail server such as voicemail server 110. According to one embodiment, voicemail server 110 may be a conventional voicemail server that performs voicemail functions as described herein. For example, if mobile device 104 may be unavailable to receive a call, the caller may be provided with an option to leave a voicemail message. If the caller decides to leave a voicemail message, voicemail server 110 may store the voicemail message for later retrieval. According to one embodiment, voicemail server 110 may send an indication of the incoming voicemail message to a visual voicemail server such as visual voicemail server 115 at 202. According to another embodiment, voicemail server 110 may transmit the voicemail message to visual voicemail server 115.

A visual voicemail may then be generated based on the indication of the incoming voicemail message received at 202. For example, visual voicemail server 115 may generate a visual voicemail that may be associated with the incoming voicemail. According to example embodiments, the visual voicemail may include data such as the voicemail sender's name, telephone number, and/or other identifying data, the time and date when the voicemail was created, or the like, such that user 102 may selectively retrieve the voicemail at mobile device 104. For example, the visual voicemail may enable user 102 to delete or save voicemail through a visual interface without having to place a telephone call to voicemail server 110 or visual voicemail server 115. In another example, the visual voicemail may also enable a user to see who the voicemail is from, when it was sent or received, and other characteristic of the voicemail without actually placing a telephone call. A visual voicemail may be intended for and received by a visual voicemail client on mobile device 104, and may be presented to user 102 through the operation of such a client. Alternatively, visual voicemail may be received and/or manipulated by other hardware and/or software elements of mobile device 104.

In one embodiment, visual voicemail server 115 may include a visual voicemail register. The visual voicemail register may maintain the delivery status for each incoming visual voicemail. For example, upon receiving the indication of the incoming voicemail message received at 202, the voicemail register may create a record for the corresponding visual voicemail. The delivery status of the visual voicemail may be initialized to "undelivered," "untransmitted," "to-be-delivered," or the like, to indicate that the visual voicemail has not been transmitted and/or delivered.

According to example embodiments, visual voicemail server 115 may transmit a notification to mobile device 104. For example, visual voicemail server 115 may generate a notification and/or other data that a new visual voicemail is available. According to one embodiment, the notification may include an application delivery notification. The application delivery notification may enable mobile device 104 to locate visual voicemail server 115 for retrieving the visual voicemail and/or to locate the visual voicemail on visual voicemail server 115. In one embodiment, such a notification may include a Message Waiting Indicator (MWI) that may be used to alert mobile device 104 that a new visual voicemail and/or a new voice message is pending for retrieval. In addition, mobile device 104 may use the MWI to alert user 102 that a new message may have arrived. For example, mobile device 104 may include a message waiting indicator application that may process the MWI such that user 102 may receive an indication that a visual voicemail is pending for retrieval.

As described above, visual voicemail server 115 may transmit a notification of the incoming visual voicemail to mobile device 104. For example, the notification may be transmitted to mobile device 104 via network 114. As described above, network 114 may include may be any type of communication network such as the internet, a Local Area Network (LAN), a Wide Area Network (WAN), a cellular telephone network, or the like. For example, network 114 may include the example networks described below in FIGS. 4-6 such as GSM, UMTS, CDMA, WiFi, WiMax, EDGE, or the like. According to one embodiment, the notification may be sent via Short Message Service (SMS) protocol or Short Message Peer to Peer protocol (SMPP).

According to one embodiment, the notification may be received on mobile device 104 through a visual voicemail client, which may be software, hardware, or a combination of software and/or hardware that presents a visual voicemail interface on a display of mobile device 104 and/or otherwise enables user 102 to interact with a visual voicemail system by operating mobile device 104. Such software may be configured to interact with visual voicemail server 115 and/or related systems or components. In one embodiment, mobile device 104 may inform visual voicemail server 115 that the notification has been received. Based on the notification, mobile device 104 may locate visual voicemail server 115 and/or locate the visual voicemail on visual voicemail server 115 to retrieve the visual voicemail message. According to one embodiment, mobile device 104 may send a request to visual voicemail server 115 through network 114 that may trigger visual voicemail server 115 to transmit the visual voicemail to mobile device 104.

According example embodiments, visual voicemail server 115 may transmit the visual voicemail to mobile device 104 the via network 114. For example, upon locating visual voicemail server 115, mobile device 104 may establish a communication session with visual voicemail server 115 based on the notification received. According to one embodiment, the visual voicemail may be transmitted in hypertext transfer protocol (HTTP), internet message access protocol (IMAP), the light weight directory access protocol (LDAP), or the like, or a combination thereof. Alternately, the visual voicemail may be accessed from computer via a simple object access protocol (SOAP), extensible markup language (XML) or the like, or a combination thereof.

After visual voicemail server 115 transmits the visual voicemail to mobile device 104, the visual voicemail may be marked as delivered. As described above, visual voicemail server 115 may include a visual voicemail register for tracking each visual voicemail's delivery status. For example, after visual voicemail server 115 transmits the voicemail to mobile device 104, the delivery status of the visual voicemail may be updated to "delivered," "transmitted," "completed" or the like to indicate that the visual voicemail has been delivered. According to one embodiment, the visual voicemail may be marked as delivered when mobile device 104 establishes a communication session with visual voicemail server 115 to retrieve the visual voicemail. In another embodiment, the visual voicemail may be marked as delivered when visual voicemail server 115 receives an indication confirming that the visual voicemail has been received by mobile device 104. In yet another embodiment, the visual voicemail may be marked as delivered when visual voicemail server 115 receives an indication confirming that mobile device 104 has received the notification of incoming visual voicemail.

As described above, visual voice mail server 115 may send a notification associated with the visual voicemail to mobile device 104 via network 114. In one embodiment, the notification may fail to reach mobile device 104 due to radio access network congestion, insufficient radio coverage, or other circumstances that may prevent mobile device 104 from receiving the notification. According to an example embodiment, mobile device 104 may fail to establish a communication session with visual voicemail server 115 to retrieve the visual voicemail, request visual voicemail server 115 to transmit the visual voicemail, or otherwise retrieve the pending visual voicemail when the notification may not be received thereby.

Thus, in one embodiment, visual voicemail server 115 may automatically trigger visual voicemail retrieval if the notification may not be received by mobile device 104. In another embodiment, visual voicemail server 115 may automatically trigger visual voicemail retrieval regardless of whether the notification may be received by mobile device 104. For example, after notifying mobile device 104, visual voicemail server 115 may start a timer to track a predetermined period of time. After the predetermined period of time has passed, visual voicemail server 115 may push the visual voicemail to mobile device 104.

According to one embodiment, the predetermined period of time may be set dynamically. For example, the predetermined period of time may be 5 minutes, 10 minutes, 20 minutes, 30 minutes, an hour, or the like that may be specified in the configuration of visual voicemail server 115, mobile device 104, or any other related systems or components, or a combination thereof.

According to another embodiment, the predetermined period of time may be set by characteristics associated with mobile device 104. For example, if mobile device 104 may be a high performance mobile device such as smart phones with internet access capabilities or the like, a relatively aggressive delivery approach may be adopted, where the predetermined period of time may be a shorter time period such as 1 minute, 5 minutes, 10 minutes or the like. Alternatively, medium performance devices such as phones with data capabilities and/or limited internet access may use 15 minutes, 30 minutes, 45 minutes or the like, and low performance devices such as voice centric phones with limited data capabilities and/or no internet access capabilities may utilize 50 minutes, 60 minutes, 70 minutes or the like as the predetermined period of time.

Visual voicemail server 115 may further include a visual voicemail retrieval timer such that visual voicemail server 115 may track time instances of visual voicemail delivery and retrieval activities. For example, the voicemail retrieval timer may track when visual voicemail server 115 may receive the indication of the incoming voicemail, when the notification of pending visual voicemail may be transmitted to mobile device 104, when the notification may be received by mobile device 104, when visual voicemail server 115 transmits the visual voicemail to mobile device 104, when the visual voicemail may be received by mobile device 104, when an indication of receipt of the visual voicemail at mobile device 104 may be received, and/or other visual voicemail delivery/retrieval activities. According to one embodiment, the voicemail retrieval timer may also prompt visual voicemail server 115 to determine or verify whether the visual voicemail has been delivered after the predetermined period of time may have elapsed, which will be described in more detail below.

As shown in FIG. 2, at 210, visual voicemail server 115 may determine whether the visual voicemail has been delivered after a predetermined period of time may have elapsed. According to one embodiment, visual voicemail server 115 may determine that the visual voicemail may have been delivered if or when the visual voicemail server may have transmitted the voicemail to mobile device 104. For example, visual voicemail server 115 may determine whether the visual voicemail may have been delivered based on a deliver status in a voicemail register. As described above, visual voicemail server 115 may include a voicemail register that may be used to track the delivery status of the visual voicemail. Accordingly to one embodiment, visual voicemail server 115 may determine whether the visual voicemail has been delivered by accessing the delivery status of the visual voicemail recorded in the voicemail register. If the accessed status indicates that the delivery status of the visual voicemail may be "delivered," "transmitted," "completed" or the like, visual voicemail server 115 may determine that the visual voicemail may have been delivered. Alternatively, visual voicemail server 115 may determine that the visual voicemail has been delivered if mobile device 104 has initiated a communication session to retrieve the visual voicemail, if visual voicemail server 115 may have received an indication confirming receipt of the visual voicemail at mobile device 104, if visual voicemail server 115 may have received an indication confirming arrival of the notification, or the like.

In another example, visual voicemail server 115 may determine whether the visual voicemail has been delivered periodically after receiving the indication of the incoming voicemail. In yet another example, visual voicemail server 115 may determine whether the visual voicemail has been delivered after transmitting the visual voicemail. In yet another example, the timing of the determination may be based on the readiness of mobile device 104. For example, visual voicemail server 115 may hold off the determination until it is notified that mobile device 104 is ready to retrieve visual voicemails.

As shown in FIG. 2, if visual voicemail server 115 determines that the visual voicemail has not been delivered to mobile device 104 at 210, visual voicemail server 115 may transmit the visual voicemail at 214. For example, visual voicemail server 115 may establish a communication session with mobile device 104. According to one embodiment, the visual voicemail may be transmitted in hypertext transfer protocol (HTTP), internet message access protocol (IMAP), or the like such that the receiving device such as mobile device 104 may receive the visual voicemail.

At 216, the visual voicemail may be marked as delivered. As described above, visual voicemail server 115 may include a visual voicemail register for tracking each visual voicemail's delivery status. For example, after visual voicemail server 115 transmits the voicemail to mobile device 104, the delivery status of the visual voicemail may be updated to "delivered," "transmitted," "completed" or the like to indicate that the visual voicemail has been delivered. According to one embodiment, the visual voicemail may be marked as delivered when visual voicemail server 115 establishes a communication session with mobile device 104 to transmit the visual voicemail. In another embodiment, the visual voicemail may be marked as delivered when visual voicemail server 115 receives an indication confirming that the visual voicemail has been received by mobile device 104.

In various example embodiments, method 200 as described above may be performed by a visual voicemail server such as visual voicemail server 115, a voicemail server such as voicemail server 110, a mobile device such as mobile device 104, any other suitable system that may receive an indication of an incoming voicemail, determine whether a visual voicemail has been delivered to the mobile device after a predetermined period of time has elapsed, and transmit the visual voicemail to the mobile device when the visual voicemail has not been delivered, or a combination thereof.

The following description sets forth some exemplary telephony radio networks and non-limiting operating environments for broadcasting secure messages. The below-described operating environments should be considered non-exhaustive, however, and thus the below-described network architectures merely show how visual voicemail messages may be incorporated into existing network structures and architectures. It may be appreciated, however, that visual voicemail messages may be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art may appreciate, the exemplary GSM/GPRS environment and services described herein also may be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of delivering a visual voicemail may be applied independently of the method for data transport, and do not depend on any particular network architecture, or underlying protocols.

Figure 3:
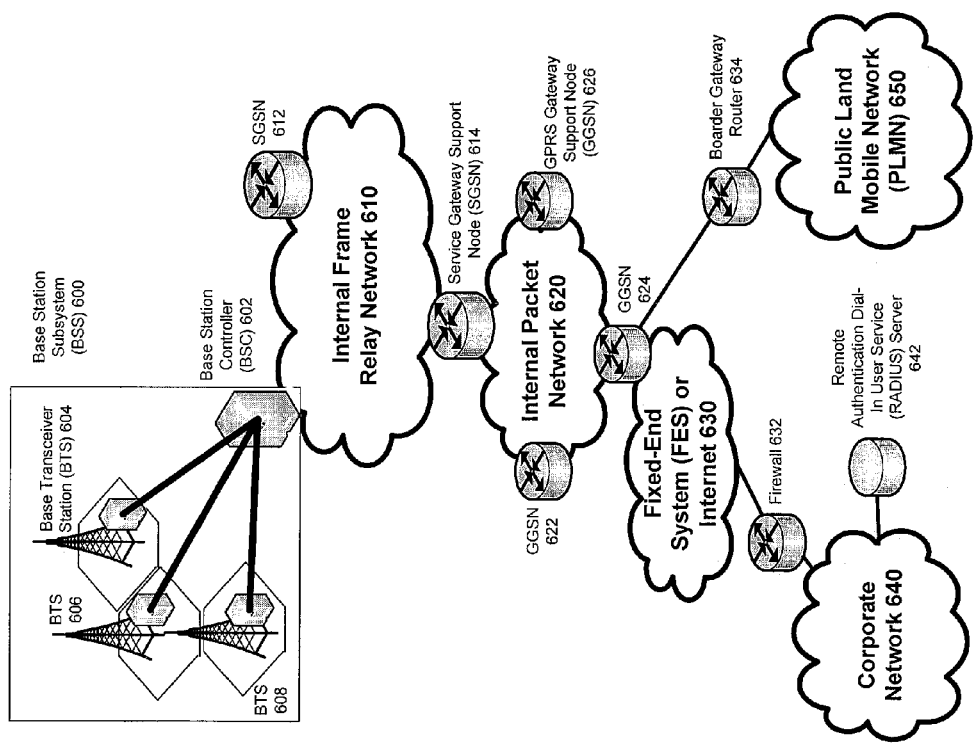
FIG. 3 depicts an overall block diagram of an exemplary packet-based mobile cellular network environment, such as a GPRS network, that may be used to provide a visual voicemail.

FIG. 3 depicts an overall block diagram of an exemplary packet-based mobile cellular network environment, such as a GPRS network, that may be used to deliver a visual voicemail. In an example configuration, network 114 may be encompassed by the network environment depicted in FIG. 3. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., mobile device 104) become connected to the wireless network. In exemplary fashion, the packet traffic originating from user devices (e.g., mobile device 104) is transported via an over-the-air interface to a BTS 608, and from the BTS 608 to the BSC 602. Base station subsystems, such as BSS 600, are a part of internal frame relay network 610 that may include Service GPRS Support Nodes ("SGSN") such as SGSN 612 and 614. Each SGSN is connected to an internal packet network 620 through which a SGSN 612, 614, etc. may route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via boarder gateway router 634. The Remote Authentication Dial-In User Service ("RADIUS") server 642 may be used for caller authentication when a user of a mobile cellular device calls corporate network 640.

Generally, there may be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 4:
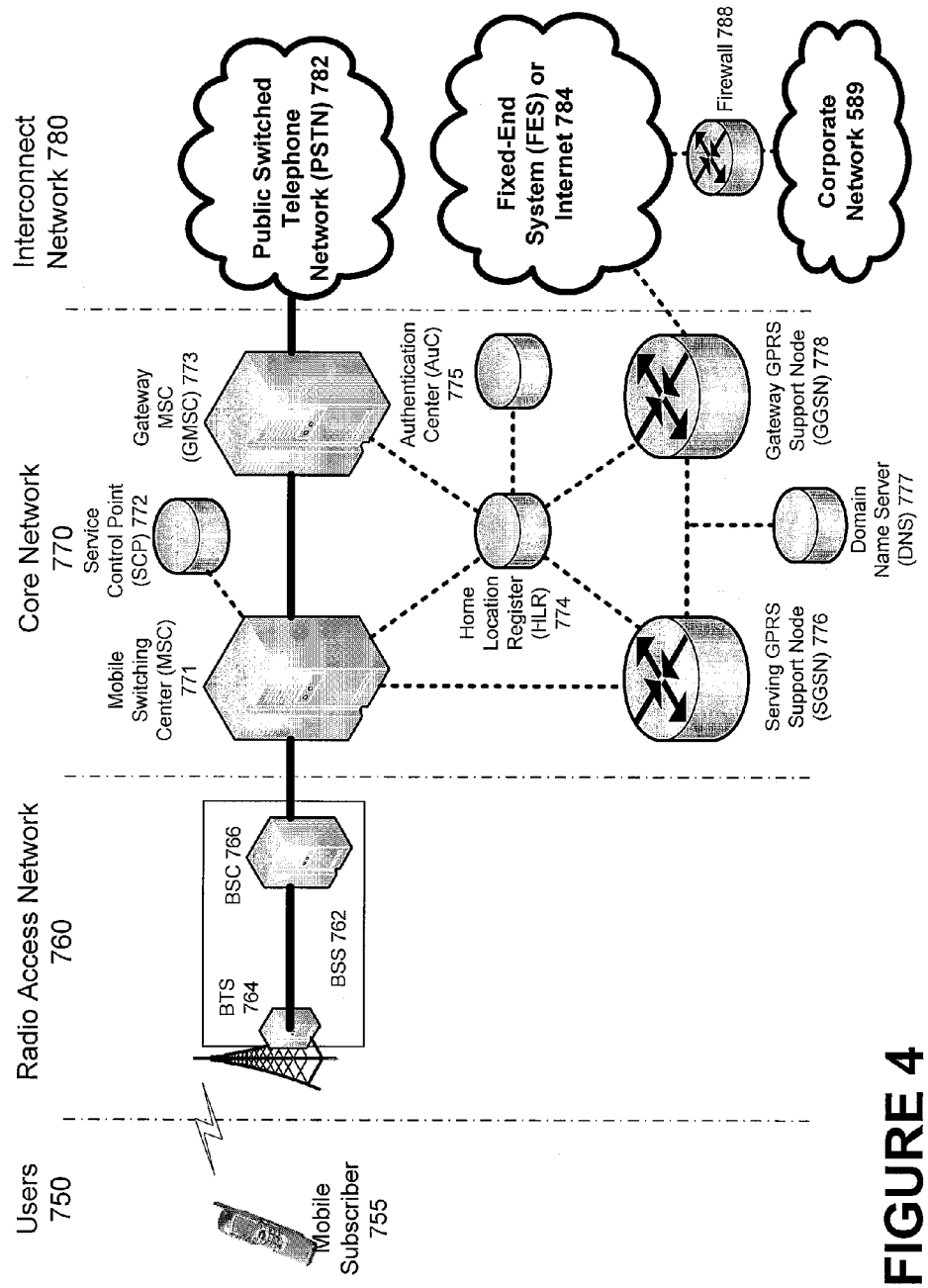
FIG. 4 illustrates an architecture of a typical GPRS network as segmented into four groups.

FIG. 4 illustrates an architecture of a typical GPRS network as segmented into four groups: users 750, radio access network 760, core network 770, and interconnect network 780. In an example configuration network 114 is encompassed by the radio access network 760, core network 770, and interconnect network 780. Users 750 comprise a plurality of end users (though only mobile subscriber 755 is shown in FIG. 4). In an example embodiment, the device depicted as mobile subscriber 755 comprises portable device 38. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 4, interconnect network 780 comprises Public Switched Telephone Network ("PSTN") 782, Fixed-End System ("FES") or Internet 784, firewall 788, and Corporate Network 789.

A mobile switching center may be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as mobile device 104, used by an end user of the mobile cellular service. When a mobile subscriber turns on his or her mobile device, the mobile device goes through an attach process by which the mobile device attaches to an SGSN of the GPRS network. In FIG. 4, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which may be corporate network 789 in FIG. 4) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 may access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 may then go through radio access network 760, core network 770, and interconnect network 780, in a particular fixed-end system or Internet 784 and firewall 788, to reach corporate network 789.

Thus, network elements that may invoke the functionality of delivering a visual voicemail may include but are not limited to Gateway GPRS Support Node tables, Fixed End System router tables, firewall systems, VPN tunnels, and any number of other network elements as required by the particular digital network.

Figure 5:
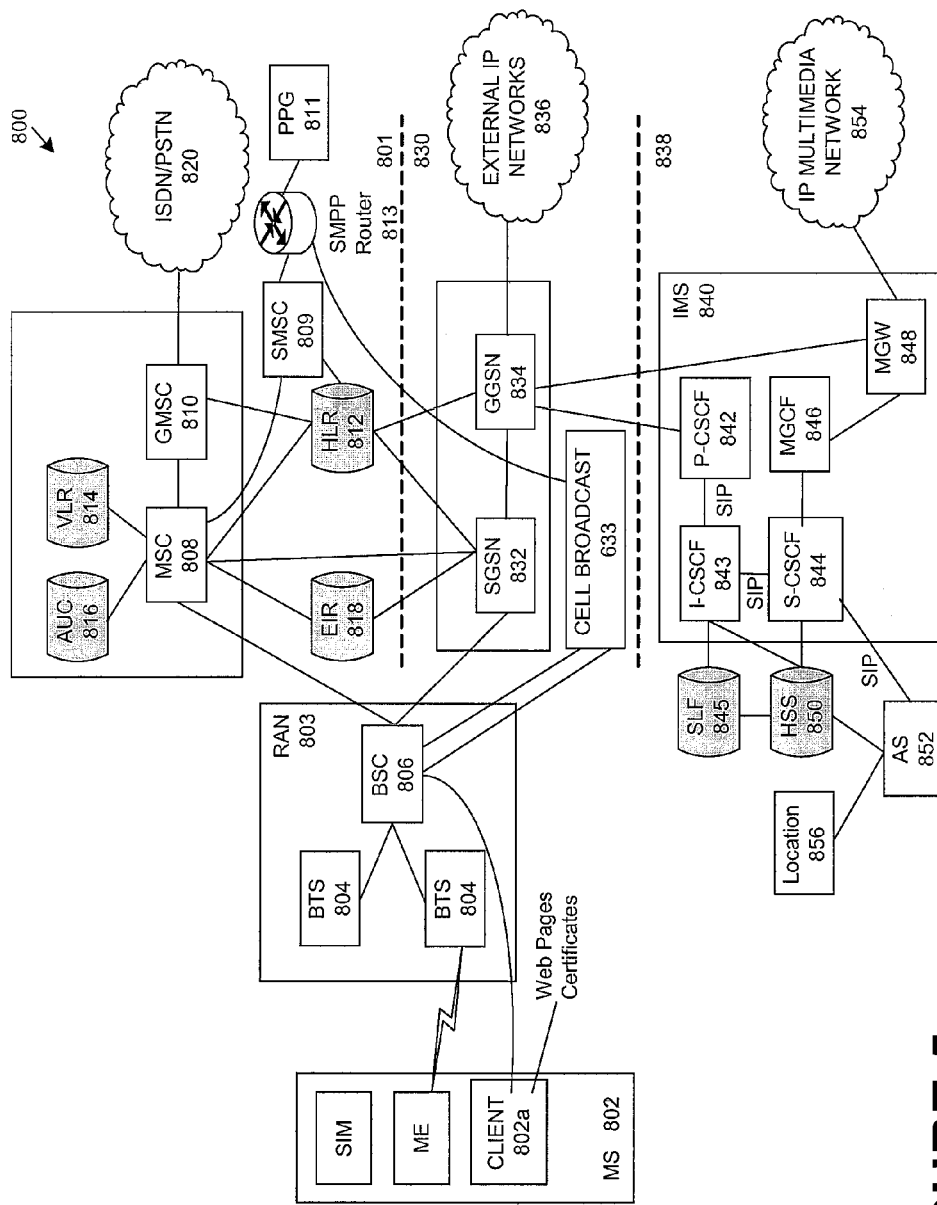
FIG. 5 illustrates an example alternate block diagram of an exemplary GSM/GPRS/IP multimedia network architecture that may be used to provide a visual voicemail.

FIG. 5 illustrates another exemplary block diagram view of a GSM/GPRS/IP multimedia network architecture 800 that may be used to deliver a visual voicemail. As illustrated, architecture 800 of FIG. 5 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., mobile device 104) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS also supports simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS may only use one of the two services at a given time.

A class C MS may attach for only one of the GPRS services and GSM services at a time. Simultaneous attachment and operation of GPRS services and GSM services is not possible with a class C MS.

A GPRS network 830 may be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS may monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of delivering a visual voicemail have been described in connection with various computing devices, the underlying concepts may be applied to any computing device or system capable of delivering a visual voicemail. The various techniques described herein may be implemented in connection with hardware or software or, where appropriate, with a combination of both. Thus, the methods and apparatus of delivering a visual voicemail, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer. In the case of program code execution on programmable computers, the computing device may include a processor, a storage medium readable by the processor (including volatile and non-volatile memory and/or storage elements), at least one input device, and at least one output device. The program(s) may be implemented in assembly or machine language, if desired. In any case, the language may be a compiled or interpreted language, and combined with hardware implementations.

The methods and apparatus for delivering a visual voicemail also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, such that the machine may become an apparatus for delivering a visual voicemail. When implemented on a general-purpose processor, the program code may combine with the processor to provide a unique apparatus that may operate to invoke the functionality of delivering a visual voicemail. Additionally, any storage techniques used in connection with activating and/or updating a mobile device to receive visual voicemail may invariably be a combination of hardware and software.

While delivering a visual voicemail has been described in connection with the various embodiments of the various figures, it is to be understood that other similar embodiments may be used or modifications and additions may be made to the described embodiment for performing the same functions described herein. For example, one skilled in the art will recognize that a system for delivering a visual voicemail as described may apply to any environment, whether wired or wireless, and may be applied to any number of devices connected via a communications network and interacting across the network.

What is claimed:
1. A method comprising:
 receiving, by a visual voicemail server, an indication of a first incoming voicemail;
 generating, by the visual voicemail server, a visual voicemail based on the indication of the first incoming voicemail;
 determining, by the visual voicemail server, whether the visual voicemail has been delivered to a mobile device, wherein determining whether the visual voicemail has been delivered to the mobile device comprises:
responsive to receiving an indication of a second incoming voicemail, determining periodically whether the visual voicemail has been delivered, wherein the indication of the second incoming voicemail arrives subsequent to the indication of the first incoming voicemail.

2. The method of claim 1, further comprising transmitting, to the mobile device, a notification that the visual voicemail is available, wherein determining whether the visual voicemail has been delivered to the mobile device further comprises determining whether an indication confirming arrival of the notification is received.

3. The method of claim 2, further comprising:
receiving an indication of a third incoming voicemail;
transmitting a third notification, to the mobile device, that a third visual voicemail associated with the third incoming voicemail is available;
receiving an indication confirming that the third notification is received; and
marking the third visual voicemail as delivered.

4. The method of claim 1, further comprising marking the visual voicemail as delivered.

5. The method of claim 1, further comprising:
maintaining a delivery status for the visual voicemail, wherein determining whether the visual voicemail has been delivered to the mobile device further comprises determining the delivery status of the visual voicemail.

6. A computer-readable storage medium, wherein the computer-readable storage medium is not a propagating signal, the computer-readable storage medium having instructions stored thereon, when executed by a processor, cause the processor to effectuate operations comprising:
receiving, by a visual voice mail server, an indication of a first incoming voicemail;
generating, by the visual voice mail server, a visual voice mail based on the indication of the first incoming voicemail;
determining, by the visual voicemail server, whether the visual voicemail has been delivered to a mobile device, wherein determining whether the visual voicemail has been delivered to the mobile device comprises:
responsive to receiving an indication of a second incoming voicemail, determining periodically whether the visual voicemail has been delivered, wherein the indication of the second incoming voicemail arrives subsequent to the indication of the first incoming voicemail.

7. The computer-readable storage medium of claim 6, the operations further comprising:
marking the visual voicemail as delivered.

8. The computer-readable storage medium of claim 6, the operations further comprising:
transmitting a notification that the visual voicemail is available;
receiving an indication confirming arrival of the notification; and
marking the visual voicemail as delivered.

9. The computer-readable storage medium of claim 6, the operations further comprising:
receiving a confirmation indication confirming receipt of the visual voicemail; and
marking the visual voicemail as delivered.

10. The computer-readable storage medium of claim 6, wherein the operations further comprising:
transmitting a notification that the visual voicemail is available;
establishing a communication session with the mobile device to transmit the visual voicemail, said communication session being initiated by the mobile device upon receiving the notification; and
marking the visual voicemail as delivered.

11. The computer-readable storage medium of claim 6, the operations further comprising:
tracking the predetermined period of time, wherein the predetermined period of time is set based on a configuration of the mobile device.

12. The computer-readable storage medium of claim 6, the operations further comprising:
tracking time instance of at least one of when the indication of the incoming voicemail is received, when a notification of the visual voicemail is transmitted, or when the visual voicemail is transmitted.

13. A system comprising:
a processor; and
memory coupled to the processor, the memory comprising executable instructions that when executed by the processor cause the processor to effectuate operation comprising:
receiving, by a visual voice mail server, an indication of a first incoming voicemail;
generating, by the visual voicemail server, a visual voicemail based on the indication of the first incoming voicemail;
determining, by the visual voice mail server, whether a visual voicemail associated with the incoming voicemail has been delivered to a mobile device, wherein determining whether the visual voicemail has been delivered to the mobile device comprises:
responsive to receiving an indication of a second incoming voicemail, determining periodically whether the visual voicemail has been delivered, wherein the indication of the second incoming voicemail arrives subsequent to the indication of the first incoming voicemail.

14. The system of claim 13, further comprising the visual voicemail register for maintaining the delivery status of the visual voicemail.

15. The system of claim 14, the operations further comprising:
accessing the delivery status of the visual voicemail in the visual voicemail register; and
determining whether the visual voicemail has been delivered to the mobile device based on the delivery status of the visual voicemail.

16. The system of claim 14, the operations further comprising:
marking the visual voicemail as delivered in the visual voicemail register.

17. The system of claim 13, further comprising a timer for tracking time instance of visual voicemail delivery and prompting the transmission of the visual voicemail to the mobile device after a predetermined period of time has elapsed.

18. The system of claim 13, further comprising a timer for tracking time instance of visual voicemail delivery and prompting the determination of whether the visual voicemail has been delivered to the mobile device after a predetermined period of time has elapsed.

* * * * *